May 12, 1959  J. C. HAWKINS  2,885,800
DITCHING MACHINE

Filed July 12, 1954  2 Sheets-Sheet 1

Inventor
JOHN C. HAWKINS
By Holcombe Wetherill & Busebois
Attorneys

May 12, 1959 J. C. HAWKINS 2,885,800
DITCHING MACHINE
Filed July 12, 1954 2 Sheets-Sheet 2

Inventor
JOHN C HAWKINS
By Holcombe
Attorneys

United States Patent Office 2,885,800
Patented May 12, 1959

2,885,800
DITCHING MACHINE

John Clement Hawkins, Clophill, England, assignor to The National Research Development Corporation, London, England, a corporation Application July 12, 1954, Serial No. 442,719

Claims priority, application Great Britain July 14, 1953

6 Claims. (Cl. 37—91)

This invention relates to mechanical power operated ditching machines.

It is an object of the invention to provide a machine which can be used for cleaning out silted and overgrown ditches, and which may also cut new ditches.

According to the present invention a ditching machine comprises a transverse beam adapted to be pivotally mounted by one end to one side of a vehicle so that it can rise and fall, a rotary cutter mounted on the outer end of the beam in a plane which is inclined to the direction of movement of the vehicle, and means for transmitting a drive to the rotary cutter.

The vehicle is preferably self-propelled, for instance an agricultural tractor, but it could be a vehicle which is not self-propelled but is adapted to be pushed or towed by another vehicle. Preferably the power unit which propels the vehicle also provides the drive for the rotary cutter, for instance through a power take-off, but an independent power unit for driving the cutter could be provided.

In operation, the vehicle is driven or moved along beside the edge of the ditch to be cleared, with the cutter in the ditch. As the cutter rotates it dislodges weeds, silt and other obstructions and flings the spoil out of the ditch.

The outer end of the beam may be at least partly supported by a supporting device such as a wheel, bogie or skid which runs along the ground. In a preferred form of the invention the supporting device is arranged to run along the bottom of the ditch. It is desirable that the vertical position of the supporting device should be adjustable relatively to the rotary cutter, for adjusting the depth of the cut. To reduce the load on the supporting device a spring may be provided between the beam and the vehicle which helps to support the weight of the beam without preventing the rise and fall of the beam.

A jack, for instance a hydraulic jack, is preferably provided between the beam and the vehicle for lifting the beam to raise the rotary cutter (and the supporting device if provided) above ground level when the vehicle is to be moved from place to place with the cutter inoperative.

In order to provide sufficient clearance between the outer end of the driving shaft and the nearside shoulder of the ditch, the driving shaft may terminate at a point well above the axle of the rotary cutter, the drive being transmitted from the driving shaft to the axle of the cutter through transmission gearing comprising, for instance, a gear train or chain and sprocket mechanism. This transmission gearing should be enclosed in a casing to avoid contamination with dirt. It may also be arranged to provide a step-down speed ratio between the driving shaft and the rotary cutter.

It is desirable to incorporate an overload clutch in the drive to the rotary cutter which is arranged to slip when the cutter encounters excessive resistance.

The rotary cutter preferably has a plurality of cutting knives on its periphery, each cutting knife when viewed in cross-section in a radial plane containing the axis of the cutter being of approximately U-shaped form, one limb of the U being attached to the main body of the cutter with the base of the U projecting beyond the periphery of the main body of the cutter on the side facing the direction of travel of the vehicle.

Preferably the cutter is provided with circumferentially spaced beater elements which lift and throw the spoil from the ditch. The leading surfaces of the beater elements may be curved out of the radial plane to increase the action of the beater elements in throwing the spoil clear of the ditch.

Although the main body of the cutter is preferably a disc, it may have apertures through it, or may comprise a rim portion and a hub portion connected together by spokes.

The invention may be performed in various ways, and one form of ditching machine embodying the invention will now be specifically described by way of example, with reference to the accompanying drawings, in which.

Figure 1:
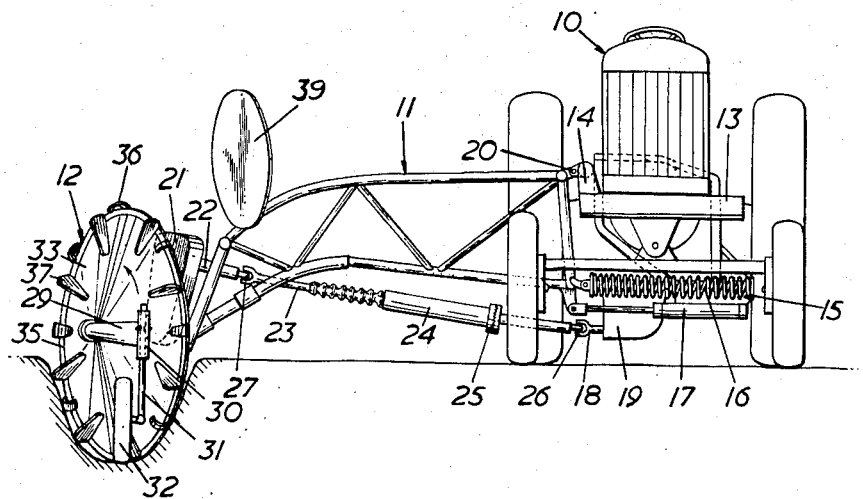
Figure 1 is a front view of the machine.
Figure 2:
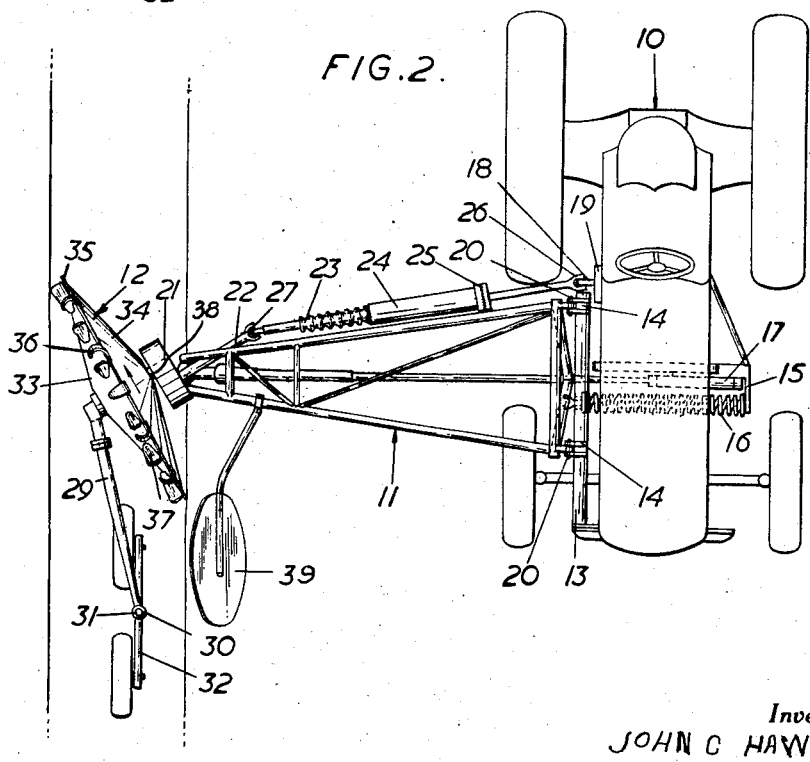
Figure 2 is a plan view of the machine.
Figure 3:
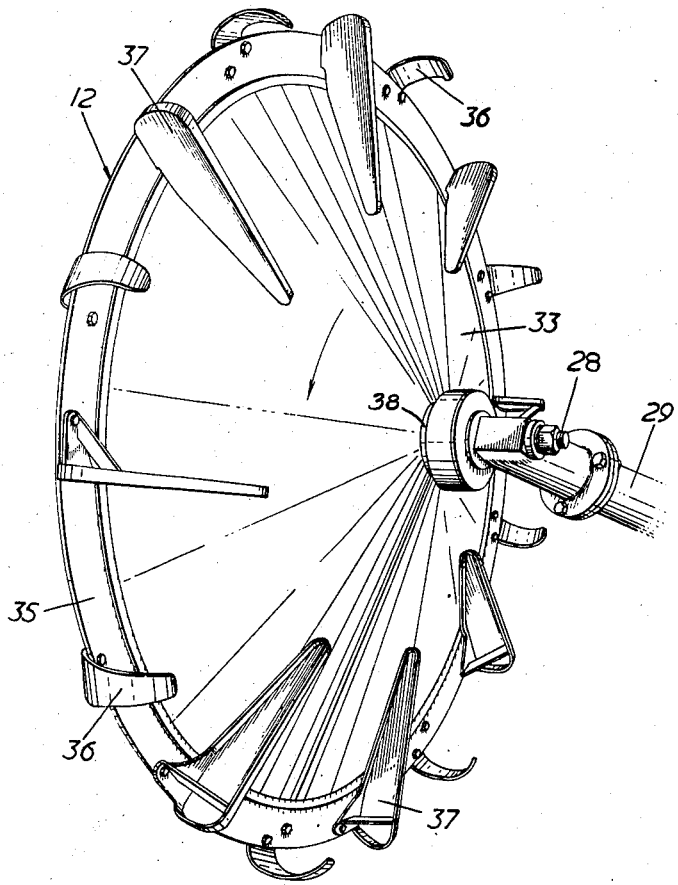
Figure 3 is an enlarged perspective view of the rotary cutter.

The machine shown in the drawings comprises three main parts, namely a vehicle 10 (in this case an agricultural tractor), a beam 11 and a rotary cutter 12.

The tractor 10 is modified to carry the beam 11 by having attached to it a supporting framework 13, which is provided with brackets 14 serving as hinge supports for the beam 11, and abutments 15 for a compression spring 16 and a hydraulic jack 17. The tractor also has a modified power take-off such that a drive is obtained through a stub-shaft 18 from bevel gearing enclosed in a housing 19 at a point in front of the rear wheels of the tractor.

The beam 11 is mounted on hinge pins 20 in the brackets 14, the axis of suspension being across the top of the inner end of the beam. The bottom of the inner end of the beam is connected to the compression spring 16 and also to the piston of the hydraulic jack 17.

The beam consists of a lattice structure of tubular steel members, and at its outer end it is rigidly connected to a gear box 21. An input shaft 22 enters the top part of the gear box 21 and receives a drive from the stub-shaft 18 through a driving shaft 23 which is provided with a telescopic splined joint 24 and an overload clutch 25 which is designed to slip when there is an excessive resistance to rotation of the driving shaft. The stub-shaft 18 and the gear box input shaft 22 are at an angle to each other, and in consequence universal joints 26 and 27 are provided, respectively, at the inner and outer ends of the driving shaft 23.

The lower end of the gear box 21 carries a hollow driving axle 38 for the rotary cutter 12. A drive is transmitted to this axle from the input shaft 22 through spur or chain gearing in the gear box, the purpose of the gear box being to enable the drive shaft 23 to have a sufficient clearance above the ground when the cutter 12 is in a relatively deep ditch. The gearing may provide a step-down speed ratio between the input shaft 22 and the axle 38.

A non-rotatable rod 28 extends through the hollow axle 38 of the cutter, and is anchored at its inner end to the gear box 21. Secured in a non-rotatable manner on the outer end of the rod 28 is an arm 29. At its forward end this arm carries a vertical sleeve 30 through which passes a rod 31 connected at its lower end to a bogie 32. The height of the rod 31 in the sleeve 30 is adjustable.

The rotary cutter 12 consists of two conical plates 33 and 34 secured to a circular rim 35. Bolted to the rim 35 are cutter knives 36. These cutter knives, when viewed in cross-section in a radial plane containing the axis of the cutter, are of approximately U-shaped form, one limb of the U being bolted to the rim 35 with the base of the U projecting beyond the rim on the side facing the direction of travel of the tractor. Between the cutter knives are beater elements 37. These do not project quite so far as the cutter knives 36 and serve to lift the spoil and throw it clear of the ditch. In order to prevent spoil from being thrown over the tractor, a deflector plate 39 may be mounted on the beam 11.

Although the beater elements 37 shown in the drawing are substantially radial, modified throwing characteristics may be obtained by altering the shape of the leading surfaces of these beater elements, for instance by making them of concave form.

The machine works as follows. When it is desired to drive the tractor to the place of use with the beam and cutter installed, the jack 17 is extended by pumping in oil from the hydraulic system of the tractor, so that the beam is lifted about the hinge 20 to raise the cutter 12 well clear of the ground. The tractor is then driven into a position alongside the ditch that requires clearing. Pressure is then relieved from the jack 17 to lower the cutter 12 into the ditch. Part of the weight of the beam and the cutter is supported by the spring 16, while the actual height of the cutter is determined by the bogie 32 coming to rest at the bottom of the ditch. When the stub-shaft 18 is rotated by engaging the power take-off, it rotates the driving shaft 23 and consequently drives the cutter disc 12, which is geared to rotate in the direction of the arrow. The cutter knives 36 cut away silt, weeds and irregularities in the walls of the ditch, while the beaters 37 pick up the spoil which has been cut down or loosened by the cutters and fling it out of the ditch. The depth of cut can be varied by adjusting the height of the sleeve 30 in relation to the rod 31 of the bogie. The tractor is driven slowly forwards so that the cutter advances along the ditch. Any rise and fall of the bottom of the ditch is compensated for by vertical movements of the bogie 32. These cause the beam to rise and fall also, and in consequence the length of the driving shaft 23 varies, as permitted by the telescopic joint 24. Should the cutter encounter an immovable rock or other obstacle, the resistance to rotation will be such that the overload clutch 25 will slip, thereby preventing damage to the working parts. The noise made by the slipping of the overload clutch indicates immediately to the driver that excessive resistance is being encountered.

It will be appreciated that numerous modifications may be made to the construction specifically described without departing from the invention.

What I claim as my invention and desire to secure by Letters Patent is:

1. A ditching machine attachment for a vehicle having a power take off comprising a frame and means for securing it to one side of said vehicle, a transverse beam having a hinge connection at one end to said frame permitting its free end to swing in a vertical plane, said hinge connection maintaining said beam against swinging horizontally relative to said vehicle, a rotary disc like cutter support journalled on a fixed bearing at the free end of said beam, the axis of said bearing making an oblique angle with the lengthwise axis of said beam, hook shape cutters and blade like beaters spaced circumferentially in alternation on one face of said support and secured thereto with cutting portions projecting radially beyond the periphery of said support and beating portions extending radially inwards thereof on said face, and articulated driving means for said cutter support adapted to be operatively connected to the power take-off of said vehicle.

2. In a ditching machine, a transverse beam, hinge means at one end of said beam adapted to be connected to one side of a vehicle having a power take-off to permit said beam to rise and fall relative to said vehicle, a rotary disc-like cutter mounted on the free end of said beam, the cutter comprising an upright disc pivoted for rotation about a transverse axis which is inclined obliquely to the direction of movement of the vehicle, the periphery of the disc extending downwards below the beam for engagement with the soil below the level of the ground surface on which the vehicle is supported, a plurality of cutting knives mounted on the front face of the disc at its periphery, each cutting knife when viewed in cross-section in a radial plane containing the axis of said disc being of an approximately U-shaped form, one limb of each U-shaped cutting knife being attached to said disc with the base of said U projecting beyond the periphery of said disc, and power driven means for rotating the cutter about its pivotal axis.

3. A ditching machine according to claim 2 including a driving shaft for said rotary cutter disc, an axle for said rotary cutter disc, said driving shaft being disposed above said axle, and transmission gearing connecting said driving shaft to said axle.

4. A ditching machine according to claim 2 including beater elements mounted on the periphery of said disc between said cutting knives, and adapted to lift and throw spoil from the ditch.

5. A ditching machine according to claim 2 adapted for use in cleaning an existing ditch including supporting means for said cutter and a connection between said supporting means and said beam for transmitting the weight of said cutter and said supporting means on to said beam and at least a part of the weight of said beam on to said supporting means, the said supporting means being adapted to run along the bottom of the ditch.

6. A ditching machine according to claim 5 including a spring between said beam and said vehicle to partly support the weight of said beam on said vehicle.

References Cited in the file of this patent

UNITED STATES PATENTS

| | | |
|---|---|---|
| 706,515 | Berford | Aug. 12, 1902 |
| 1,041,522 | Smith | Oct. 15, 1912 |
| 1,379,845 | Barnes | May 31, 1921 |
| 1,721,392 | Heumann | July 16, 1929 |
| 1,762,441 | Johnson | June 10, 1930 |
| 2,169,079 | Bosworth et al. | Aug. 8, 1939 |
| 2,323,343 | Meese | July 6, 1943 |
| 2,550,071 | Larkin | Apr. 24, 1951 |
| 2,552,710 | Dodson | May 15, 1951 |
| 2,646,632 | Kershaw | July 28, 1953 |
| 2,685,751 | Bain | Aug. 10, 1954 |
| 2,705,379 | Fruhling | Apr. 5, 1955 |
| 2,748,679 | Rogers | June 5, 1956 |

FOREIGN PATENTS

| | | |
|---|---|---|
| 388,408 | Germany | Jan. 17, 1924 |